Patented Oct. 20, 1942

2,299,069

UNITED STATES PATENT OFFICE 2,299,069

CHLORINATION OF ORGANIC COMPOUNDS

Albert G. Chenicek, Barberton, Ohio, assignor to Pittsburgh Plate Glass Company, Allegheny County, Pa., a corporation of Pennsylvania No Drawing. Application March 15, 1939, Serial No. 262,065

1 Claim. (Cl. 260—248)

This invention relates to the chlorination of dicyandiamide and melamine and particularly to the substitution chlorination of these organic compounds in order to produce compounds of high chlorine content. In chlorinating such compounds, by conventional processes, it is often found that it is difficult to avoid the formation of lower chloro derivatives and to promote the formation of compounds of higher chlorine content. Thus, where di-, tri-, or tetra-chloro derivatives are desired, it is often found that only small portions of these materials can be secured because of the substantially greater portions of mono-chloro derivatives which are formed.

In accordance with my invention, I have found that products of high chlorine content may be secured by chlorinating these organic compounds in the presence of an alkali metal compound, particularly alkaline alkali metal compounds such as sodium or potassium carbonate, bicarbonate or hydroxide, sodium acid phosphate, sodium stannate, etc. The reaction appears to be assisted by the presence of a small amount of water which appears to act in the nature of a catalyst. Since only a small amount of water is required, and water in an amount sufficient to form a solution of the carbonate or other compound is undesirable, it is preferred to make use of a solid compound containing residual amounts of water. Thus, a monohydrate of sodium carbonate or the di- or monohydrate of sodium hydroxide may be used for this purpose. Small amounts of water appear to be sufficient for most purposes and in the case of compounds containing water of constitution, such as sodium bicarbonate or sodium or potassium hydroxide, no additional water may be required. In addition, the process may be conducted in the substantial absence of water with efficient results. This is particularly true when materials containing water of constitution, such as alkali metal hydroxides or alkali metal bicarbonates or other acid salts are used.

The process is preferably conducted in the presence of a suitable organic solvent for chlorine, such as carbon tetrachloride, etc. Where the product being chlorinated is a liquid or gas and a gaseous or liquid product is produced, the solvent may be dispensed with, if desired.

The exact reactions which occur are not known but it is possible that a quantity of chlorine monoxide is generated as an intermediate product during the reaction which stimulates the formation of higher chlorinated products. At all events, it is found that higher yields of the higher chlorinated products may be produced in the presence of a compound such as sodium carbonate than in the absence of this material or other alkaline alkali metal compound.

The amount of chlorine and alkali metal compound may be varied widely in accordance with the degree of chlorination desired. In general, approximately equal molecular proportions of chlorine and alkali metal compound are used. Generally it is found that through the use of an alkaline alkali metal compound, such as sodium carbonate, substantially lower temperatures are required to secure a compound having a high chlorine content than is required to produce a compound having the same chlorine content without the carbonate.

The following example is illustrative:

Example

A carbon tetrachloride slurry containing 160 parts by weight of sodium carbonate, and 62 parts by weight of melamine per liter of carbon tetrachloride was placed in a container and a stream of chlorine introduced into the reaction space at a temperature of 10° C. for a period of 7 hours. The product produced was a yellow colored solid which contained 128 percent active chlorine. The composition of the solid corresponded roughly to hexachloromelamine. Attempts to secure compounds containing above 119 percent of active chlorine by chlorinating a dispersion of melamine in an aqueous alkaline solution or in carbon tetrachloride in the absence of the sodium carbonate at temperatures up to 25° C. were unsuccessful.

Although the present invention has been described and claimed with reference to the specific details of certain embodiments thereof, it is not intended that such details shall be regarded as limitations upon the scope of the invention except insofar as included in the accompanying claim.

I claim:

A method of chlorinating a compound of the group consisting of dicyandiamide and melamine in the presence of an alkaline alkali metal compound and sufficient water to assist the reaction but insufficient to form an aqueous solution in liquid state.

ALBERT G. CHENICEK.